(12) United States Patent
Kim et al.

(10) Patent No.: US 9,574,488 B2
(45) Date of Patent: Feb. 21, 2017

(54) INTAKE SYSTEM FOR ENGINE

(71) Applicant: Hyundai Motor Company, Seoul (KR)

(72) Inventors: Woo Tae Kim, Anyang-si (KR); Chun Woo Lee, Suwon-si (KR); In Gee Suh, Yongin-si (KR); Joon Won Lim, Seoul (KR); Il Joong Hwang, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 565 days.

(21) Appl. No.: 14/075,966

(22) Filed: Nov. 8, 2013

(65) Prior Publication Data

US 2014/0366838 A1 Dec. 18, 2014

(30) Foreign Application Priority Data

Jun. 13, 2013 (KR) .................. 10-2013-0067695

(51) Int. Cl.
F02B 27/00 (2006.01)
F02M 35/10 (2006.01)

(52) U.S. Cl.
CPC ...... *F02B 27/005* (2013.01); *F02M 35/10045* (2013.01); *F02M 35/10052* (2013.01); *F02M 35/10131* (2013.01); *Y02T 10/146* (2013.01)

(58) Field of Classification Search
USPC ............... 123/184.21–184.59, 389, 537
See application file for complete search history.

(56) References Cited

U.S. PATENT DOCUMENTS

| 4,515,115 A * | 5/1985 | Okubo ............... F02B 27/00 123/184.42 |
| 4,641,610 A * | 2/1987 | Rutschmann ....... F02B 27/0252 123/184.28 |
| 4,926,802 A * | 5/1990 | Morris ............... F02B 27/02 123/184.42 |
| 5,109,811 A * | 5/1992 | Tanaka ............ F02M 35/10032 123/184.36 |
| 5,168,839 A * | 12/1992 | Hitomi ............... F02D 41/3094 123/184.42 |
| 5,267,543 A * | 12/1993 | Novak ............... F02B 31/08 123/184.52 |
| 5,515,822 A * | 5/1996 | Kobayashi ........... F02B 27/00 123/184.35 |
| 5,524,583 A * | 6/1996 | Nishio ............... F02B 75/22 123/184.34 |
| 5,740,778 A * | 4/1998 | Corcoran ........... F02B 31/08 123/306 |
| 5,832,894 A * | 11/1998 | Espe ............... F02B 27/02 123/184.43 |

(Continued)

FOREIGN PATENT DOCUMENTS

JP 57-18761 U 1/1982
JP 63-156459 U 10/1988
(Continued)

*Primary Examiner* — Hung Q Nguyen
*Assistant Examiner* — Brian P Monahon
(74) *Attorney, Agent, or Firm* — Morgan, Lewis & Bockius LLP

(57) ABSTRACT

Output performance of the engine may be maximized by a configuration in which air is supplied so as to maximize volumetric efficiency of the respective cylinders in a multi-cylinder engine including a plurality of cylinders.

7 Claims, 3 Drawing Sheets

(56) References Cited

U.S. PATENT DOCUMENTS

| | | | | |
|---|---|---|---|---|
| 6,571,759 B2* | 6/2003 | Homi | ............... | F02M 35/10026 |
| | | | | 123/184.47 |
| 6,955,149 B1* | 10/2005 | Christie | ............. | F02B 27/0252 |
| | | | | 123/184.36 |
| 7,275,511 B1* | 10/2007 | Wright | ................. | F02M 35/116 |
| | | | | 123/184.48 |
| 8,800,524 B2* | 8/2014 | Groleau | ........... | F02M 35/10032 |
| | | | | 123/184.21 |
| 2002/0139340 A1* | 10/2002 | Matsumoto | ......... | F02B 27/0263 |
| | | | | 123/184.55 |
| 2003/0015089 A1* | 1/2003 | Takahashi | ........... | F02B 27/0284 |
| | | | | 92/89 |
| 2003/0106516 A1* | 6/2003 | Nishimura | .............. | F02B 27/02 |
| | | | | 123/184.42 |
| 2004/0154574 A1* | 8/2004 | Menin | ................... | B29C 45/006 |
| | | | | 123/184.42 |
| 2007/0012282 A1* | 1/2007 | Ohba | ...................... | F02B 27/02 |
| | | | | 123/198 E |
| 2008/0276895 A1* | 11/2008 | Phaneuf | ............. | F02B 27/0284 |
| | | | | 123/184.53 |
| 2010/0294238 A1* | 11/2010 | Brewer | ................ | F02D 9/1095 |
| | | | | 123/306 |
| 2012/0000438 A1* | 1/2012 | Sakagami | ........... | F02B 27/0263 |
| | | | | 123/184.47 |

FOREIGN PATENT DOCUMENTS

| | | |
|---|---|---|
| JP | 4-91360 A | 3/1992 |
| JP | 5-47371 U | 6/1993 |
| JP | 8-74598 A | 3/1996 |
| JP | 11-247728 A | 9/1999 |
| KR | 10-2006-0002213 A | 1/2006 |
| KR | 10-2006-0014932 A | 2/2006 |

* cited by examiner

INTAKE SYSTEM FOR ENGINE

CROSS REFERENCE TO RELATED APPLICATION

The present application claims priority of Korean Patent Application Number 10-2013-0067695 filed Jun. 13, 2013, the entire contents of which application is incorporated herein for all purposes by this reference.

BACKGROUND OF INVENTION

Field of Invention

The present invention relates to an intake system for an engine, and more particularly, to a structure of an intake system capable of supplying air to each of a plurality of cylinders included in an engine.

Description of Related Art

An intake system for a multi-cylinder engine including a plurality of cylinders according to the related art generally has a configuration in which air may be supplied to the respective cylinders using an intake manifold.

The intake manifold has a configuration in which one pipe connected to the atmosphere is branched into a plurality of pipes connected to the respective cylinders so that air may be supplied to each of the plurality of cylinders by branching one inlet sucking the air from the atmosphere into the plurality of cylinders.

Meanwhile, in order to burn a larger amount of fuel in a limited volume to improve specific power of the engine, the cylinder of the engine should suck a maximum amount of air to maximize volumetric efficiency.

Therefore, the entire configuration of the intake system for an engine including the intake manifold supplying the air to the respective cylinders of the engine becomes a factor that has a very large effect on performance of the engine.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for an intake system for an engine capable of maximizing output performance of the engine by having a configuration in which air is supplied so as to maximize volumetric efficiency of the respective cylinders in a multi-cylinder engine including a plurality of cylinders.

Various aspects of the present invention provide for an intake system for an engine, including: a throttle body; at least two primary branch pipes branched from the throttle body; and a plurality of secondary branch pipes branched from the primary branch pipes into at least two of a plurality of cylinders configuring one engine.

The present methods and apparatuses have other features and advantages apparent from the accompanying drawings, incorporated herein, and below Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
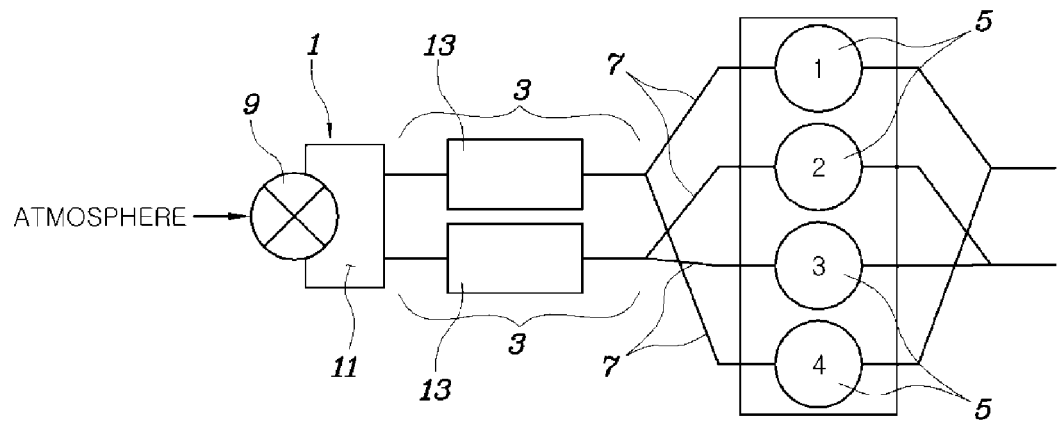
FIG. 1 is a conceptual diagram showing an exemplary intake system for an engine according to the present invention.
Figure 2:
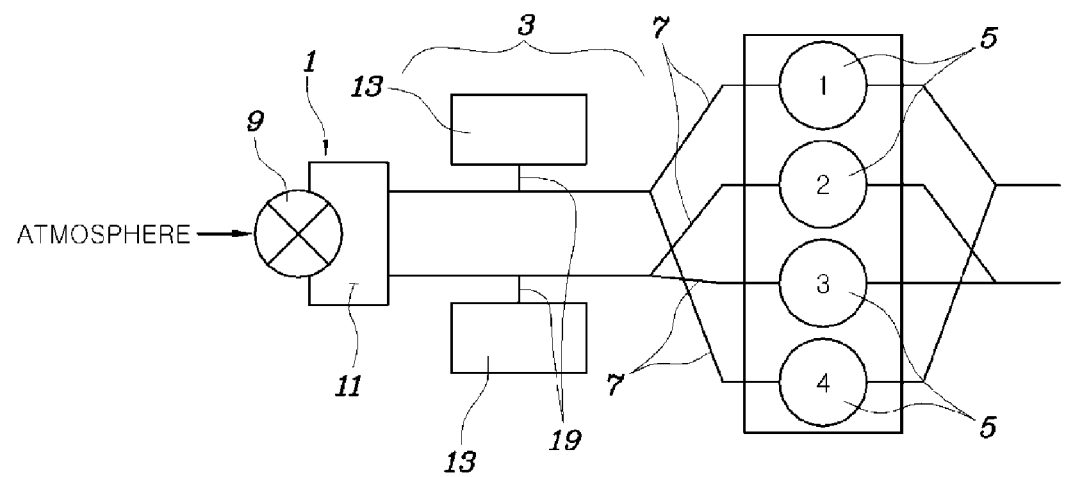
FIG. 2 is a conceptual diagram showing an exemplary intake system for an engine according to the present invention.

Referring to FIGS. 1 and 2, each of the intake systems for an engine according to various embodiments of the present invention is configured to include a throttle body 1; at least two primary branch pipes 3 branched from the throttle body 1; and a plurality of secondary branch pipes 7 branched from the primary branch pipes 3 into at least two of a plurality of cylinders 5 configuring one engine.

That is, the throttle body 1 is configured to receive air introduced from the atmosphere through at least one pipe, control the entire amount of air sucked into the engine through a throttle valve 9, and supply the air to the respective cylinders 5 by a sequential branch structure of the primary and secondary branch pipes 3 and 7 disposed at a rear end thereof.

A first chamber 11 accommodating air in a predetermined volume thereof is provided between the throttle valve 9 of the throttle body 1 and the primary branch pipe 3, and the primary branch pipes 3 may have the entire volume at least larger than stroke volumes of the respective cylinders 5.

In various embodiments and as shown in FIGS. 1 and 2, the primary branch pipes 3 are further provided with separate second chambers 13 accommodating air on the pipe in order to form the entire volume of the primary branch pipes 3.

The primary branch pipes 3 may also be configured so that the entire volume of the primary branch pipes themselves is larger than the stroke volumes of the respective cylinders, without separately including the second chambers 13.

In various embodiments as shown in FIG. 1, the second chamber 13 has a form of a space in which a cross section of a pipe is expanded and then contracted on a pipe of the primary branch pipe 3, and in various embodiments as shown in FIG. 2, the second chamber 13 has a form of a space connected to the middle of a pipe of the primary branch pipe 3 through a separate connection neck 19.

Here, each of the volume of the first chamber 11 and the entire volume of the primary branch pipes 3 may be more than two times than the stroke volumes of respective cylinders 5.

That is, in order to always smoothly satisfy air amounts required in the respective cylinders 5, each of the volume of the first chamber 11 and the entire volume of the primary branch pipes 3 should be more than two times than the stroke volumes of the respective cylinders 5. In this case, sufficient volumetric efficiency is secured in the respective cylinders 5, thereby making it possible to improve an output of the engine.

Figure 5:
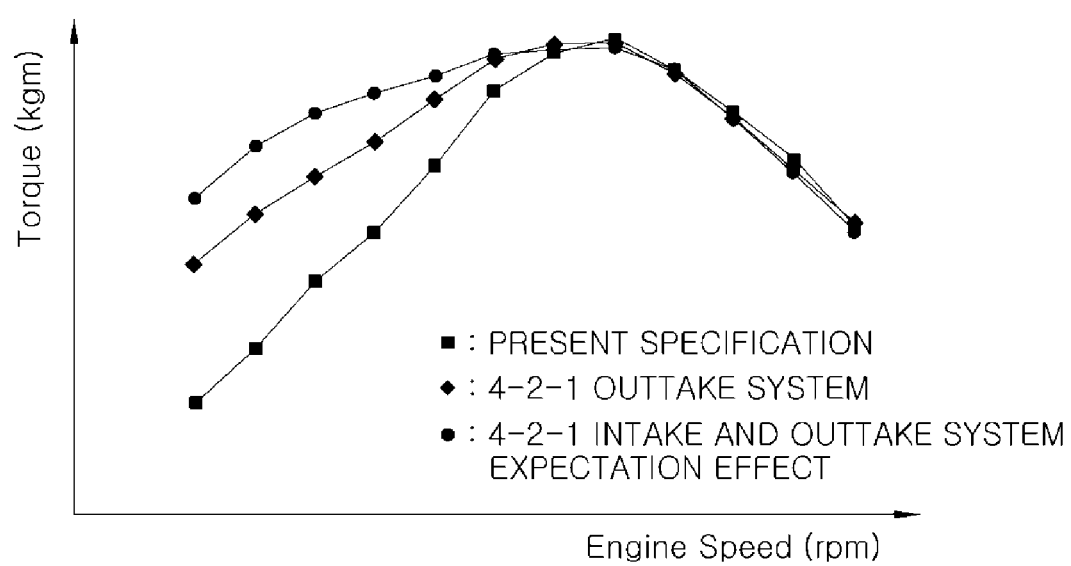
FIG. 5 is a graph of a torque depending on an engine speed in which an effect of the present invention is compared with the related art.

FIG. 5 shows experimental data indicating that the engine using the intake system according to various embodiments of the present invention to which the restriction of the volume of the first chamber 11 and the entire volume of the primary branch pipes 3 as described above is applied has output characteristics improved as compared with a general engine according to the related art that does not use the intake system according to various embodiments of the present invention and an engine in which a 4-2-1 type of outtake manifold is used only in an outtake system. Particularly, it could be appreciated from FIG. 5 that the present invention represents significant output improvement in low speed and medium speed regions of the engine as compared with the related art.

Meanwhile, the secondary branch pipes 7 branched from one primary branch pipe 3 may be connected to cylinders 5 having ignition times different from those of other cylinders 5 among a series of ignition times, respectively, to prevent intake interference between the respective cylinders 5 from being generated.

That is, in the case in which the engine is an inline 4 cylinder engine including first to fourth cylinders 5 sequentially disposed in a row as shown in FIG. 1 or FIG. 2, two primary branch pipes 3 are branched from the throttle body 1, the secondary branch pipes 7 are branched in pairs from each of the primary branch pipes 3, two secondary branch pipes 7 branched from one of the two primary branch pipes 3 are connected to the second and third cylinders 5, respectively, and two secondary branch pipes 7 branched from the other of the two primary branch pipes 3 are connected to the first and fourth cylinders 5, respectively.

In this case, since the engine is ignited in a sequence of the first cylinder-the third cylinder-the fourth cylinder-the second cylinder, the respective cylinders 5 connected to the secondary branch pipes 7 as described above substantially independently receive air from the throttle body 1 in a state in which the respective cylinders are isolated from the cylinders 5 having ignition times adjacent to those of the respective cylinders by the secondary branch pipes 7 and the primary branch pipes 3, thereby preventing deterioration of volumetric efficiency due to intake interference.

Figure 3:
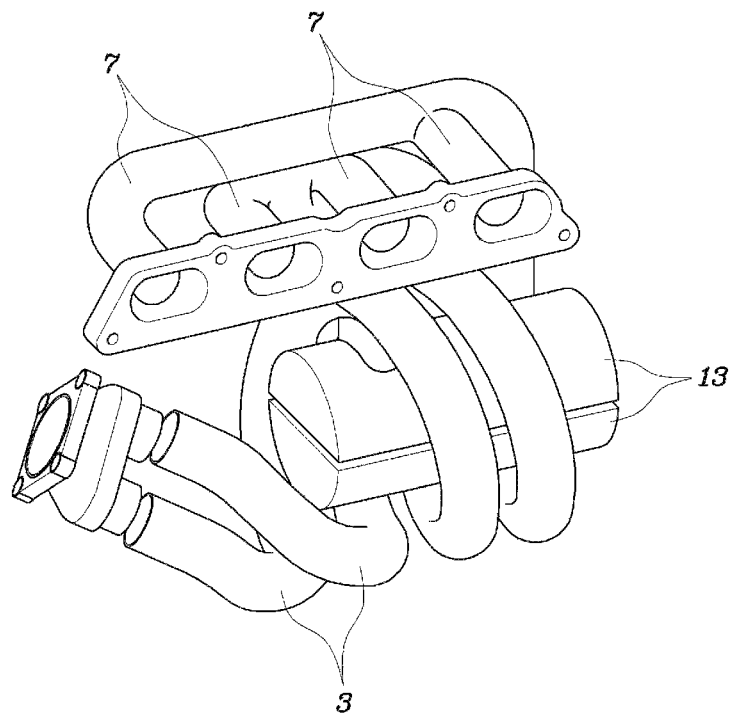
FIG. 3 is a perspective view showing an exemplary intake system for an engine according to the present invention.
Figure 4:
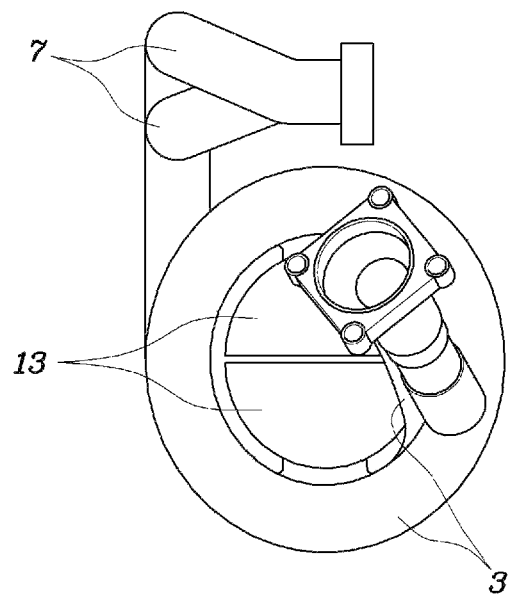
FIG. 4 is a diagram viewed from the left of FIGS. 3.

FIGS. 3 and 4 three-dimensionally show the intake system according to various embodiments of the present invention. The intake system according to various embodiments of the present invention has a structure in which the primary branch pipes 3 are spirally twisted from a rear end of the throttle body 1 and have the second chambers 13 positioned at the center of a spiral portion and the secondary branch pipes 7 are disposed in a state in which end portions thereof connected to the cylinders 5 are opened on a straight line.

Here, the second chambers 13 may have a vessel shape in which a predetermined cross section shape is lengthily extended along a spiral central axis formed by the primary branch pipes 3.

Particularly, in various embodiments, the second chambers 13 are formed of vessels in which each of the semi-circular predetermined cross section shapes is lengthily extended along the spiral central axis formed by the primary branch pipes 3 to form one cylindrical appearance, thereby making it possible to make the intake system compact and secure a volume of the second chambers 13 enough to secure volumetric efficiency of the respective cylinders 5.

Although the second chambers 13 has the cylindrical appearance by disposing vessels separated from each other and having two semi-circular cross sections as shown to be adjacent to each other, the second chambers 13 may be formed in an integral cylindrical shape in which the two vessels are formed integrally with each other and a partition wall isolating the two vessels from each other is formed at the center. One will appreciate that such integral components may be monolithically formed.

According to various embodiments of the present invention, it is possible to maximize output performance of the engine by a configuration in which air is supplied so as to maximize volumetric efficiency of the respective cylinders in a multi-cylinder engine including a plurality of cylinders.

For convenience in explanation and accurate definition in the appended claims, the terms rear, left, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An intake system for an engine, comprising:
a throttle body;
at least two primary branch pipes extending from the throttle body; and
a plurality of secondary branch pipes extending from respective primary branch pipes into at least two of a plurality of cylinders configuring one engine,
wherein the primary branch pipes are provided with separate second chambers accommodating air in order to form an entire volume of the primary branch pipes,
wherein the primary branch pipes are spirally twisted from a rear end of the throttle body and have the second chambers positioned at the center of a spiral portion of the primary branch pipes, and
wherein the second chambers are formed in a vessel shape in which each of semi-circular predetermined cross section shapes thereof is lengthily extended along a spiral central axis of the primary branch pipes to form one cylindrical appearance.

2. The intake system of claim 1, wherein a first chamber accommodating air in a predetermined volume thereof is provided between a throttle valve of the throttle body and the primary branch pipes; and
the primary branch pipes have an entire volume at least larger than stroke volumes of the respective cylinders.

3. The intake system of claim 1, wherein the second chambers have a space in which a cross section is expanded and then contracted on the primary branch pipes.

4. The intake system of claim 1, wherein the second chambers have a space connected to the middle of the primary branch pipes through a separate connection neck.

5. The intake system of claim 2, wherein each of the volume of the first chamber and the entire volume of the primary branch pipes is more than two times than the stroke volumes of the respective cylinders.

6. The intake system of claim 5, wherein the secondary branch pipes branched from one primary branch pipe of the primary branch pipes are connected to cylinders having ignition times different from those of other cylinders among a series of ignition times, respectively.

7. The intake system of claim 6, wherein the engine is an inline 4 cylinder engine including first to fourth cylinders sequentially disposed in a row;
- two primary branch pipes are branched from the throttle body;
- the secondary branch pipes are branched in pairs from each of the primary branch pipes;
- two secondary branch pipes branched from a first primary branch pipe of the two primary branch pipes are connected to second and third cylinders, respectively; and
- two secondary branch pipes branched from a second primary branch pipe of the two primary branch pipes are connected to first and fourth cylinders, respectively.

* * * * *